United States Patent
Nakashima et al.

(10) Patent No.: US 9,347,202 B2
(45) Date of Patent: May 24, 2016

(54) CONSTRUCTION MACHINE

(75) Inventors: Hajime Nakashima, Hiroshima (JP); Masaru Numasawa, Hiroshima (JP); Kazuhiro Ueda, Hiroshima (JP); Zenzo Yamaguchi, Kobe (JP); Yasumasa Kimura, Kobe (JP)

(73) Assignees: KOBELCO CONSTRUCTION MACHINERY CO., LTD., Hiroshima-shi (JP); Kobe Steel, Ltd., Kobe-shi (JP)

( * ) Notice: Subject to any disclaimer, the term of this patent is extended or adjusted under 35 U.S.C. 154(b) by 205 days.

(21) Appl. No.: 14/233,022

(22) PCT Filed: Jul. 11, 2012

(86) PCT No.: PCT/JP2012/004483
§ 371 (c)(1),
(2), (4) Date: Jan. 15, 2014

(87) PCT Pub. No.: WO2013/011665
PCT Pub. Date: Jan. 24, 2013

(65) Prior Publication Data
US 2014/0151143 A1   Jun. 5, 2014

(30) Foreign Application Priority Data

Jul. 19, 2011   (JP) ................... 2011-157829

(51) Int. Cl.
*B60K 13/04*   (2006.01)
*E02F 9/08*    (2006.01)
(Continued)

(52) U.S. Cl.
CPC .............. *E02F 9/0866* (2013.01); *B60K 11/06* (2013.01); *E02D 17/13* (2013.01); *F01N 3/05* (2013.01);
(Continued)

(58) Field of Classification Search
CPC .... B60K 13/04; F01N 13/082; F01N 2470/02
See application file for complete search history.

(56) References Cited

U.S. PATENT DOCUMENTS 4,388,804 A * 6/1983 Bushmeyer ........... F01N 13/082
123/41.64
4,903,484 A * 2/1990 Yates ..................... B60K 13/04
60/316

(Continued)

FOREIGN PATENT DOCUMENTS

CN   102052134 A   5/2011
JP    3-37222 U    4/1991

(Continued)

OTHER PUBLICATIONS

International Search Report Issued Sep. 18, 2012 in PCT/JP12/04483 Filed Jul. 11, 2012.

(Continued)

*Primary Examiner* — Katy M Ebner
(74) *Attorney, Agent, or Firm* — Oblon, McClelland, Maier & Neustadt, L.L.P (57) ABSTRACT

A construction machine includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct. A portion on a distal end side of the exhaust gas pipe is inserted into the duct, and the inserted portion of the exhaust gas pipe inserted into the duct is formed with an exhaust hole which causes the exhaust gas to be discharged in a direction different from a flowing direction of discharge wind in the duct through the exhaust hole.

21 Claims, 5 Drawing Sheets

(51) Int. Cl.
  *F01N 3/05* (2006.01)
  *F01N 13/08* (2010.01)
  *E02D 17/13* (2006.01)
  *B60K 11/06* (2006.01)

(52) U.S. Cl.
  CPC ............... *F01N 13/082* (2013.01); *B60K 13/04* (2013.01); *B60Y 2200/412* (2013.01); *F01N 2590/08* (2013.01); *Y02T 10/20* (2013.01)

(56) References Cited

U.S. PATENT DOCUMENTS

| | | | | |
|---|---|---|---|---|
| 7,703,573 | B2* | 4/2010 | Feight | F01N 13/082 180/309 |
| 7,958,966 | B2* | 6/2011 | Smith | F01N 13/082 181/212 |
| 7,971,432 | B2* | 7/2011 | Troxler | F01N 13/082 180/296 |
| 8,033,104 | B2* | 10/2011 | Zhang | F01N 3/36 60/295 |
| 8,550,208 | B1* | 10/2013 | Potokar | F02K 3/075 181/212 |
| 2004/0088968 | A1* | 5/2004 | Koelm | B08B 15/02 60/282 |
| 2006/0258237 | A1 | 11/2006 | Sodemann et al. | |
| 2009/0071136 | A1* | 3/2009 | Smith | F01N 13/082 60/324 |
| 2010/0132347 | A1 | 6/2010 | Ikeda et al. | |
| 2010/0186395 | A1* | 7/2010 | Yang | F01N 1/14 60/311 |
| 2011/0099990 | A1* | 5/2011 | Lang | F01N 13/082 60/320 |
| 2012/0318602 | A1* | 12/2012 | Bada Ghar Wala | B60K 13/04 180/309 |
| 2013/0298539 | A1* | 11/2013 | Jang | E02F 9/0866 60/320 |

FOREIGN PATENT DOCUMENTS

| | | |
|---|---|---|
| JP | 3 229907 | 10/1991 |
| JP | 5-312050 A | 11/1993 |
| JP | 7 139369 | 5/1995 |
| JP | 2002-285858 A | 10/2002 |
| JP | 2002-317631 A | 10/2002 |
| JP | 2004-353461 A | 12/2004 |
| JP | 2005-264870 A | 9/2005 |
| JP | 3147564 U | 12/2008 |
| JP | 2009-30559 A | 2/2009 |
| JP | 4578336 B2 | 11/2010 |
| JP | 2011 64068 | 3/2011 |
| JP | 2011-106287 A | 6/2011 |
| KR | 10-1999-0005042 A | 1/1999 |
| KR | 20-2000-0006762 U | 4/2000 |
| WO | WO 2006/077774 A1 | 7/2006 |
| WO | WO 2009/019806 A1 | 2/2009 |

OTHER PUBLICATIONS

International Preliminary Report on Patentability and Written Opinion issued on Jan. 30, 2014, in PCT/JP2012/004483 filed Jul. 11, 2012.
Office Action issued on May 26, 2015 in Korean Patent Application No. 10-2014-7003848 with English Summary.
Office Action issued Nov. 23, 2014 in Korean Patent Application No. 10-2014-7003848 (with English summary).
Extended European Search Report issued Mar. 30, 2015 in Patent Application No. 12814762.6.

* cited by examiner

CONSTRUCTION MACHINE

TECHNICAL FIELD

The present invention relates to a construction machine such as a hydraulic shovel provided with a structure for discharging exhaust gas of an engine and cooling air to an outside of an engine room.

BACKGROUND ART

A background art will be described by way of a hydraulic shovel, for example.

Figure 9:
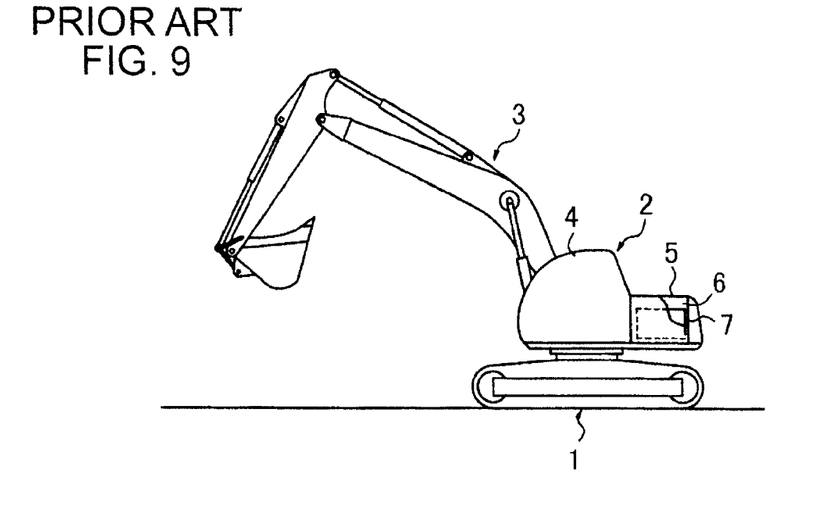
FIG. 9 is a schematic general side view of a hydraulic shovel to which the present invention is applied.

As illustrated in FIG. 9, a hydraulic shovel includes a lower propelling body 1, an upper slewing body 2 that is rovolvably mounted on the lower propelling body 1, a work attachment (excavator attachment) 3 attached to the upper slewing body 2, and a cabin 4.

An engine room 6 formed of an engine cover 5 is provided at the back of the upper slewing body 2. An engine 7 and related devices thereof are accommodated in the engine room 6.

Figure 10:
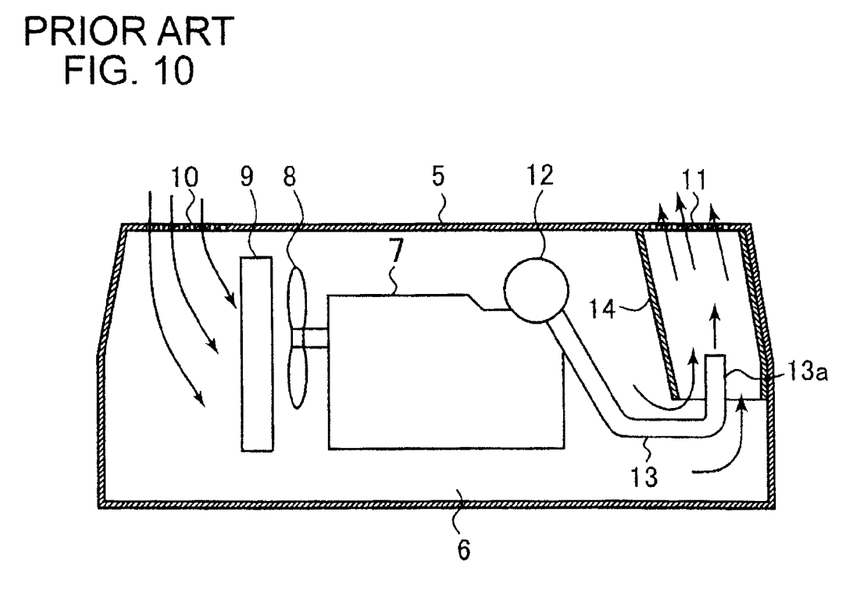
FIG. 10 is a schematic cross-sectional view of an engine room according to a known technique.

One disclosed in Patent Document 1 is known as a structure for discharging exhaust gas from the engine 7 and air that has cooled a heat exchanger to an outside of the engine room 6. This known technique will be described with reference to FIG. 10. FIG. 10 is a schematic view of a cross-section of the engine room 6 when seen from a rear side of the engine room 6.

A cooling fan 8 driven by the engine 7 and a heat exchanger 9 such as a radiator are provided in the engine room 6 on one end side of the engine 7. An intake opening 10 is formed in a portion on a side of an upper wall of the engine cover 5 where the fan 8 and the heat exchanger 9 are set, and a discharge opening 11 is formed in a portion on the opposite side of the upper wall. Outside air is introduced into the engine room 6 through the intake opening 10 with rotation of the fan 8 and passes through the heat exchanger 9, and air after cooling (hereinafter referred to as discharge wind) is discharged from the discharge opening 11.

On the other hand, a silencer (muffler) 12 is located on the other end side of the engine 7. The exhaust gas emitted from the engine 7 is discharged to the outside through the silencer 12 and an exhaust gas pipe (tail pipe) 13 connected to the silencer 12.

Here, since the exhaust gas is hot (for example, 500° C.), the exhaust gas deteriorates ambient temperature environment if the exhaust gas is directly discharged to the outside through the exhaust gas pipe 13. Moreover, in a configuration where the exhaust gas and the discharge wind are discharged as they are, the leakage to the outside of operating noise such as engine sound, exhaust sound, and discharge wind sound increases.

Therefore, in the known technique, a cylindrical duct 14 is provided at a position of the engine room 6 below the discharge opening 11 so as to extend in the up-down direction in a state where an upper end of the duct 14 is open to the discharge opening 11, and a lower end of the duct 14 is open to the inner side of the engine room 6. A distal end portion 13a of the exhaust gas pipe 13 is bent upward at the lower side of the duct 14 so that the distal end portion 13a is inserted into the duct 14 from the lower end of the duct 14.

By doing so, the discharge wind and the exhaust gas are guided into the duct 14, and both are mixed in the duct 14, whereby the temperature of the exhaust gas is decreased. After that, the discharge wind and the exhaust gas are discharged to the outside, and operating noise in the duct is reduced.

However, the pressure and the flow rate of the exhaust gas are greatly different from those of the discharge wind. Specifically, the pressure and the flow rate of the exhaust gas are higher than those of the discharge wind. Thus, it is naturally difficult for the exhaust gas and the discharge wind to mix with each other. Further, the known technique has a configuration in which the distal end portion 13a of the exhaust gas pipe 13 is inserted upward into the duct 14, and the exhaust gas is emitted from an opening (that is, intensively from one point) of the distal end portion 13a in the same direction as the discharge wind in the duct 14. Due to this, the mixing efficiency of the exhaust gas and the discharge wind worsens. Thus, the effect of decreasing the temperature of the exhaust gas is low.

Moreover, since the exhaust gas is discharged from the opening of the distal end portion 13a of the exhaust gas pipe 13 straightly toward the discharge opening 11, the reduction effect of the exhaust sound in the duct 14 also decreases.

Patent Document 1: Japanese Patent Application Publication No. H3-229907

SUMMARY OF INVENTION

An object of the present invention is to provide a construction machine capable of improving the mixing efficiency of the exhaust gas and the discharge wind and the noise reduction effect.

A construction machine according to an aspect of the present invention includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct, wherein a portion on a distal end side of the exhaust gas pipe is inserted into the duct, and the inserted portion of the exhaust gas pipe inserted into the duct is formed with an exhaust hole which causes the exhaust gas to be discharged in a direction different from a flowing direction of discharge wind in the duct through the exhaust hole.

A construction machine according to another aspect of the present invention includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct, wherein a portion on a distal end side of the exhaust gas pipe is inserted into the duct, and the inserted portion of the exhaust gas pipe inserted into the duct is formed with an exhaust hole which causes the exhaust gas to be discharged so as to be dispersed in a longitudinal direction of the inserted portion through the exhaust hole.

A construction machine according to still another aspect of the present invention includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct, wherein a portion on a distal end side of the exhaust gas pipe is inserted into the duct, and the inserted portion of the exhaust gas pipe inserted into the duct is formed with an exhaust hole which causes the exhaust gas to be discharged in a direction different from a flowing direction of discharge wind in the duct through the exhaust hole and causes the exhaust gas to be discharged so as to be dispersed in a longitudinal direction of the inserted portion through the exhaust hole.

EMBODIMENTS OF THE INVENTION

Hereinafter, embodiments of the present invention will be described with reference to FIGS. 1 to 8.

In the following respective embodiments, the following features (A) to (D) are the same as those of the known technique illustrated in FIG. 10.

(A) An engine room 6 is formed of an engine cover 5 at a rear part of an upper slewing body, and an engine 7 and related devices thereof are accommodated in the engine room 6.

Figure 1:
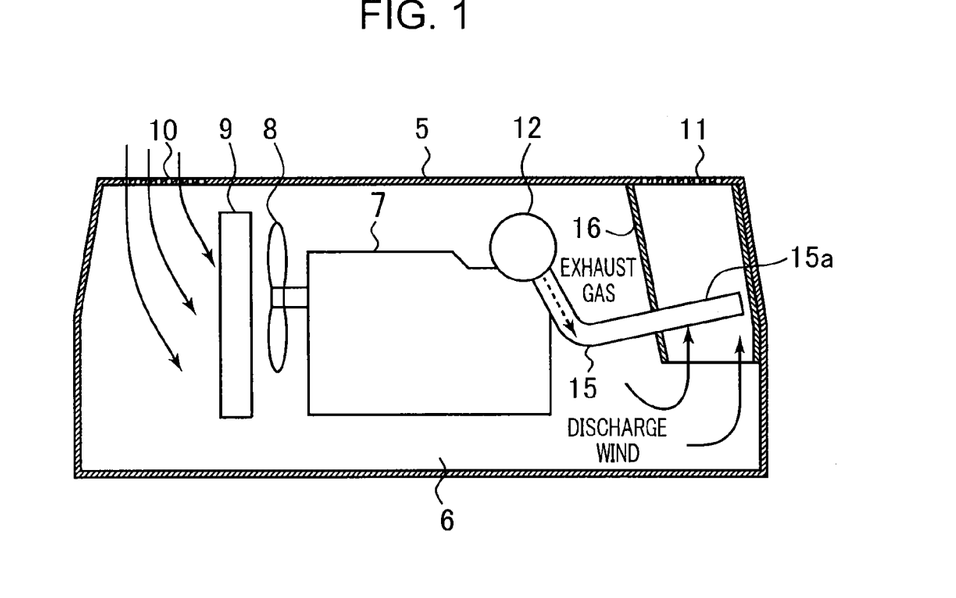
FIG. 1 is a schematic cross-sectional view of an engine room according to a first embodiment of the present invention.

(B) A cooling fan 8 driven by the engine 7 and a heat exchanger 9 such as a radiator (both the fan 8 and the heat exchanger 9 are illustrated in FIG. 1 only) are provided in the engine room 6 on one end side of the engine 7. An intake opening 10 (illustrated in FIG. 1 only) is formed in a portion of an upper wall near an end portion of the engine cover 5 on a side where the fan 8 and the heat exchanger 9 are set, and a discharge opening 11 is formed in a portion of the upper wall near an end portion on the opposite side. Outside air is introduced into the engine room 6 through the intake opening 10 with rotation of the fan 8 and passes through the heat exchanger 9, and air after cooling (hereinafter referred to as discharge wind) that has cooled the heat exchanger 9 is discharged from the discharge opening 11.

(C) A silencer (muffler) 12 is located on the other end side of the engine 7, and the exhaust gas emitted from the engine 7 is discharged to the outside through the silencer 12 and an exhaust gas pipe (tail pipe) 15 connected to the silencer 12.

(D) A cylindrical duct 16 is provided at a position of the engine room 6 below the discharge opening 11 so as to extend in the up-down direction in a state where an upper end of the duct 16 is open to the discharge opening 11, and a lower end of the duct 16 is open to the inner side of the engine room 6. The discharge wind and the exhaust gas are introduced into the duct 16 and mixed with each other, whereby the temperature of the exhaust gas is decreased. After that, the discharge wind and the exhaust gas are discharged to the outside, and the operating noise in the duct 16 is reduced.

First Embodiment

Figure 2:
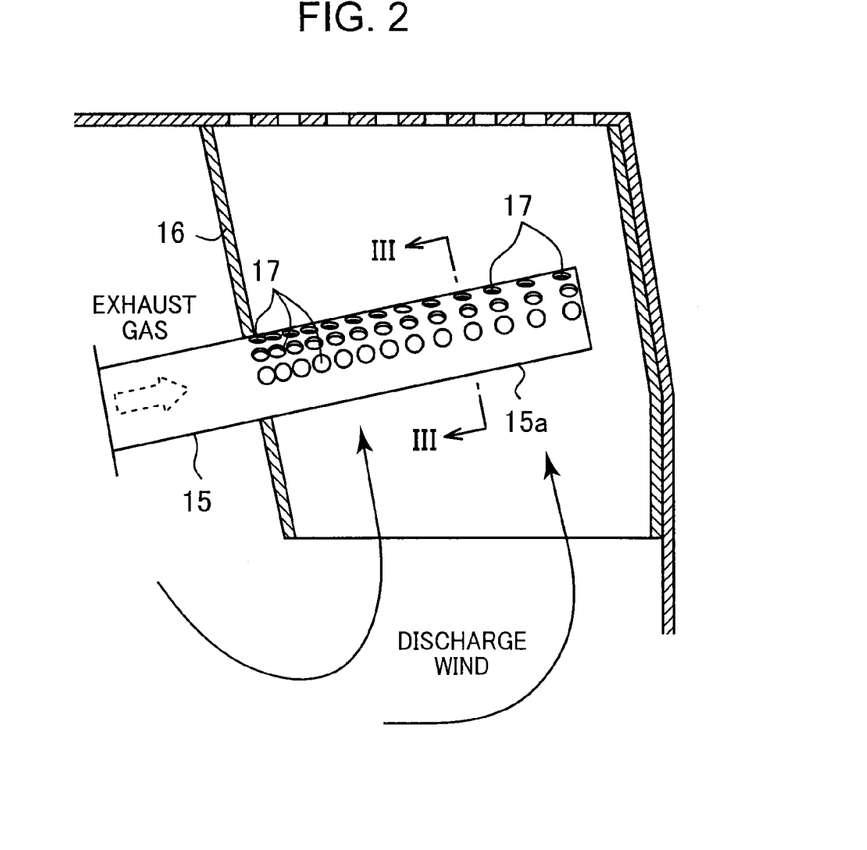
FIG. 2 is an enlarged view of a portion of FIG. 1.
Figure 3:
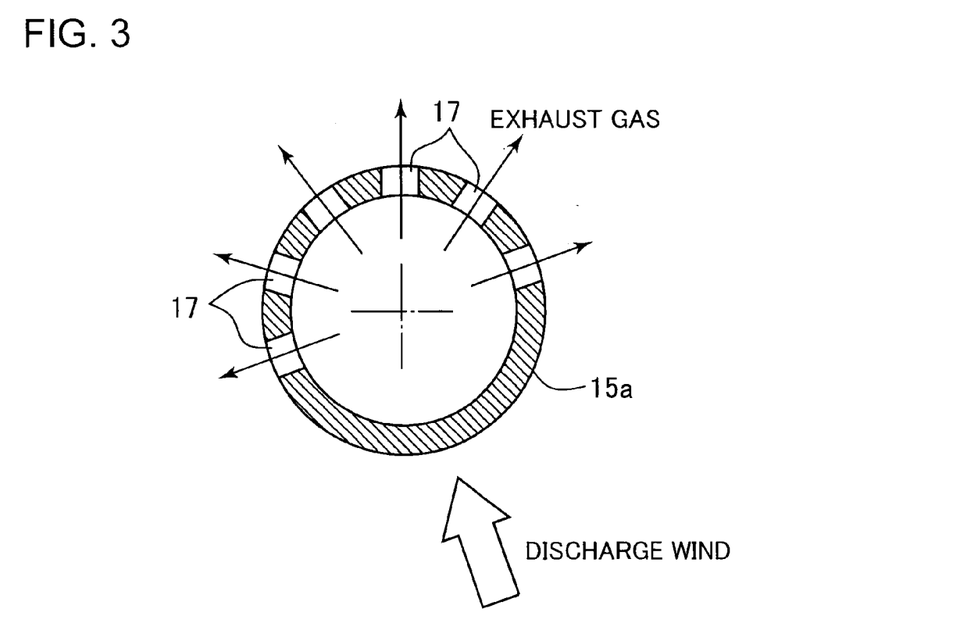
FIG. 3 is an enlarged cross-sectional view of an inserted portion of an exhaust gas pipe along line in FIG. 2.

See FIGS. 1 to 3

In the first embodiment, the exhaust gas pipe 15 is bent at an intermediate portion thereof so as to extend toward the duct 16. A portion on a distal end side (a side opposite to the engine 7) of the exhaust gas pipe 15 is inserted into the duct 16 while passing through a side wall of the duct 16. That is, an inserted portion 15a which is a portion on the distal end side of the exhaust gas pipe 15 extends in a direction intersecting (preferably orthogonal to as illustrated) the extension direction of the duct 16 and is inserted into the duct 16 in a state of substantially crossing the inside of the duct 16.

As illustrated in FIGS. 2 and 3, the inserted portion 15a of the exhaust gas pipe 15 is formed with a plurality of exhaust holes 17 for jetting into the duct 16 the exhaust gas which flows through the inside of the inserted portion 15a. The plurality of exhaust holes 17 is formed in a semi-circumferential portion (a semi-circumferential portion on the upper side of a line that is orthogonal to a flowing direction of the discharge wind and extends in a radial direction of the inserted portion 15a) of the inserted portion 15a positioned on the leeward side of the discharge wind that passes through the inside of the duct 16. The exhaust holes 17 are formed at a plurality of different positions of the semi-circumferential portion of the inserted portion 15a so as to be spaced from each other in the circumferential direction and are formed at a plurality of different positions spaced from each other in the longitudinal direction of the inserted portion 15a as illustrated in the drawing.

Moreover, the opening area of the exhaust holes 17 per unit length of the inserted portion 15a gradually decreases toward the distal end side (the side opposite to the engine 7) of the inserted portion 15a so that the amounts of the exhaust gas discharged from the exhaust holes 17 are approximately equalized in the longitudinal direction of the inserted portion 15a. In other words, the percentage of the opening area of the exhaust holes 17 to the non-opening area of the inserted portion 15a gradually decreases toward the distal end side of the inserted portion 15a. As a result, the amounts of the exhaust gas discharged from the exhaust holes 17 are approximately equalized in the longitudinal direction of the inserted portion 15a.

Specifically, as illustrated in FIG. 2, the arrangement interval of the exhaust holes 17 in the longitudinal direction of the inserted portion 15a gradually increases toward the distal end side of the inserted portion 15a. That is, the arrangement density of the exhaust holes 17 gradually decreases toward the distal end side of the inserted portion 15a.

Moreover, the size of the exhaust holes 17 may be set so that the exhaust hole 17 arranged closer to the distal end of the inserted portion 15a has a smaller size than that of the exhaust hole 17 arranged away from the distal end side.

The exhaust hole 17 may be a circular hole as illustrated in the drawing and may be a rectangular hole. Alternatively, the exhaust hole 17 may be a slot that is long in the longitudinal direction of the inserted portion 15a. When the exhaust hole 17 is a slot, a width thereof may decreases toward the distal end side of the inserted portion 15a.

Moreover, in the first embodiment and the second to fifth embodiments described later, the opening at the distal end of the exhaust gas pipe 15 is closed or is narrowed to have a small opening area.

In the first embodiment, the exhaust gas is jetted into the duct 16 in a radial form with respect to the center (the center in the radial direction) of the inserted portion 15a from the semi-circumferential portion (see FIG. 3) of the inserted portion 15a positioned on the leeward side of the discharge wind and from a portion extending approximately over the entire length of the inserted portion 15a.

That is, the exhaust gas is jetted in the following manner.

(i) The exhaust gas is jetted in a direction different from the flowing direction of the discharge wind in the duct 16.

(ii) The exhaust gas is jetted so as to be dispersed in the circumferential direction and the longitudinal direction of the inserted portion 15a.

According to the configuration of the first embodiment, first, due to the effect that the exhaust gas is jetted in the different direction as indicated in (i), since the exhaust gas of which the pressure and flow rate are higher than the discharge wind stays long in a large area in the cross-section of the duct 16, the exhaust gas easily mixes with the discharge wind of which the pressure and the flow rate are low.

Second, due to the effect that the exhaust gas is dispersed in the circumferential direction and the longitudinal direction as indicated in (ii), the exhaust gas mixes with the discharge wind in a larger area in the duct 16.

Due to the synergistic of the two effects, the mixing efficiency of the exhaust gas and the discharge wind can be improved. As a result, the exhaust gas and the discharge wind can be discharged to the outside from the duct 16 and the discharge opening 11 after the temperature of the exhaust gas is reliably decreased to a desired temperature. Specifically, for example, the exhaust gas and the discharge wind can be discharged to the outside after the temperature of the exhaust gas is decreased from 500° C. to 100° C.

Moreover, due to the exhaust gas jetting effects as indicated in (i) and (ii), the discharge sound (exhaust sound) of the exhaust gas easily makes contact with the inner surface of the duct 16, and sound that is emitted from the engine 7 and the silencer 12 and comes outside while riding on the discharge wind is easily dispersed and reflected in the duct 16 together with the exhaust gas. Thus, it is possible to reduce the operating noise emitted to the outside.

That is, according to the first embodiment, the exhaust gas temperature reduction effect and the noise reduction effect can be improved more remarkably than the known technique.

Second to Fifth Embodiments

See FIGS. 4 to 7

In the following embodiments, the same portions as the first embodiment will be denoted by the same reference numerals and only the differences from the first embodiment will be described.

Second Embodiment

Figure 4:
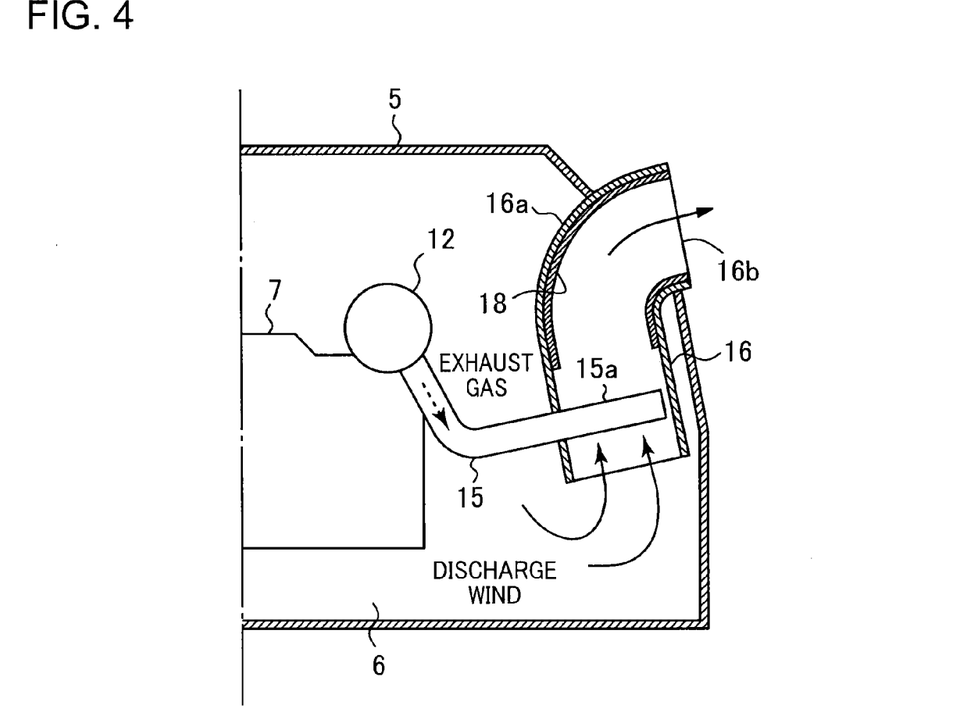
FIG. 4 is a schematic cross-sectional view of a portion of an engine room according to a second embodiment of the present invention.

See FIG. 4

In the second embodiment illustrated in FIG. 4, the duct 16 is bent so that an upper portion thereof faces the side opposite to the engine 7. The inserted portion 15a of the exhaust gas pipe 15 is disposed at a position upstream side (the duct lower side) of a bent portion 16a in the flowing direction of the discharge wind, the bent portion 16a being a bent portion of the duct 16. Moreover, the duct 16 has an outlet-side opening 16b which is an outlet of the discharge wind that flows through the inside of the duct 16. The inserted portion 15a of the exhaust gas pipe 15 is inserted into the duct 16 in a state where the inserted portion 15a cannot be viewed from the outside through the outlet-side opening 16b of the duct 16.

Moreover, a noise absorbing material 18 formed from glass wool or the like is formed on an inner surface of the entire bent portion 16a of the duct 16 and an inner surface of the duct 16 under the bent portion 16a.

The other configuration of the second embodiment is the same as that of the first embodiment.

According to the second embodiment, in addition to the same basic operations and effects as the first embodiment, it is possible to obtain an operational effect that the bent portion 16a provided in the duct 16 makes it difficult for overall noise to leak to the outside, and the inserted portion 15a of the exhaust gas pipe 15 disposed closer to the upstream side than the bent portion 16a makes it difficult for the discharge sound of the exhaust gas to leak to the outside.

Further, according to the second embodiment, since in the duct 16 the inserted portion 15a of the exhaust gas pipe 15 is located at such a position that the inserted portion 15a cannot be viewed from the outside through the outlet-side opening 16b of the duct 16, it is possible to prevent the generation of "direct sound" that noise comes out directly from the duct 16.

Further, in the second embodiment, operating noise including the exhaust sound dispersed into the duct 16 as described above is efficiently absorbed by the noise absorbing material 18. Due to this, the second embodiment is further advantageous in terms of noise prevention or reduction.

In the second embodiment, the outlet-side opening 16b of the duct 16 also serves as a discharge opening.

As a variation of the second embodiment, the inserted portion 15a of the exhaust gas pipe 15 may be provided in a state where only a portion of the inserted portion 15a is visible from the outside through the outlet-side opening 16b of the duct 16.

Third and Fourth Embodiments

Figure 5:
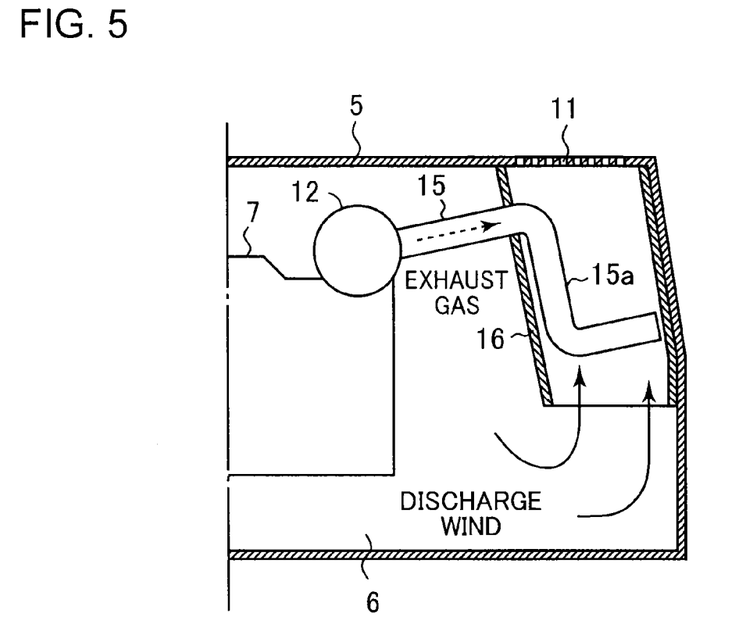
FIG. 5 is a schematic cross-sectional view of a portion of an engine room according to a third embodiment of the present invention.
Figure 6:
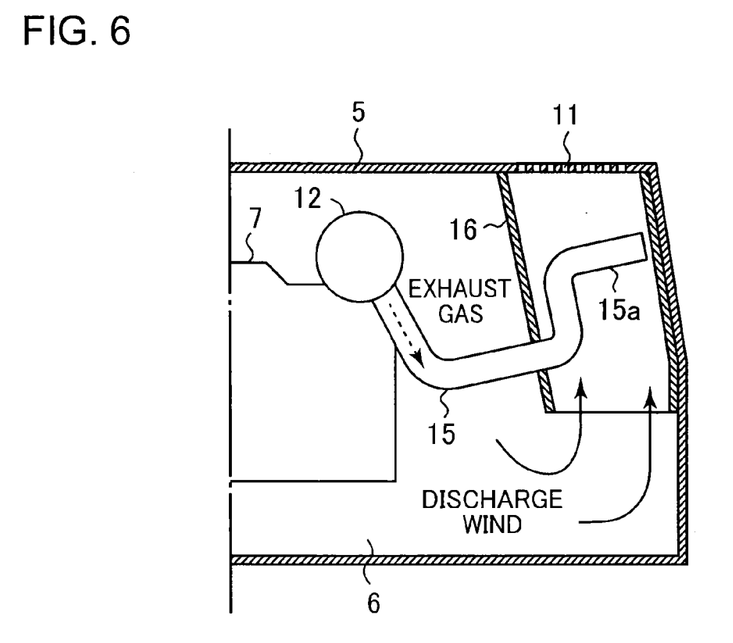
FIG. 6 is a schematic cross-sectional view of a portion of an engine room according to a fourth embodiment of the present invention.

See FIGS. 5 and 6

In the third embodiment illustrated in FIG. 5, the inserted portion 15a of the exhaust gas pipe 15 inserted into the duct 16 is bent downward, and a portion positioned closer to the distal end side than the downwardly bent portion is bent again to form an L-shape as viewed from the back side. Moreover, in the fourth embodiment illustrated in FIG. 6, the inserted portion 15a of the exhaust gas pipe 15 inserted into the duct 16 is bent upward, and a portion positioned closer to the distal end side than the upwardly bent portion is bent again to form an inverted L-shape as viewed from the back side.

In these cases, the exhaust holes (not illustrated in FIGS. 5 and 6) may be formed only in the horizontal side part of the L-shaped portion or the inverted L-shaped portion of the inserted portion 15a (the portion on the distal end side), the horizontal side part extending in the horizontal direction, and may be formed only in the vertical side part of the L-shaped portion or the inverted L-shaped portion, the vertical side part extending in the vertical direction. Alternatively, the exhaust holes may be formed in both the horizontal side and the vertical side.

Moreover, similarly to the first embodiment, the exhaust holes are preferably formed in such a state that the exhaust gas is jetted through the exhaust holes so as to be dispersed in the longitudinal direction and the circumferential direction of a portion of the inserted portion 15a (the portion on the distal end side) where the exhaust holes are formed.

According to the third and fourth embodiments, since the entire length of the inserted portion 15a of the exhaust gas pipe 15 can be increased, the exhaust gas can be dispersed more broadly in the duct 16.

Although FIGS. 5 and 6 illustrate the duct configuration of the first embodiment in which the duct 16 has a form of a straight pipe extending in the up-down direction, the configuration of the third and fourth embodiments can be applied to a duct configuration illustrated in FIG. 4 where the bent portion 16a is provided in the duct 16.

Fifth Embodiment

Figure 7:
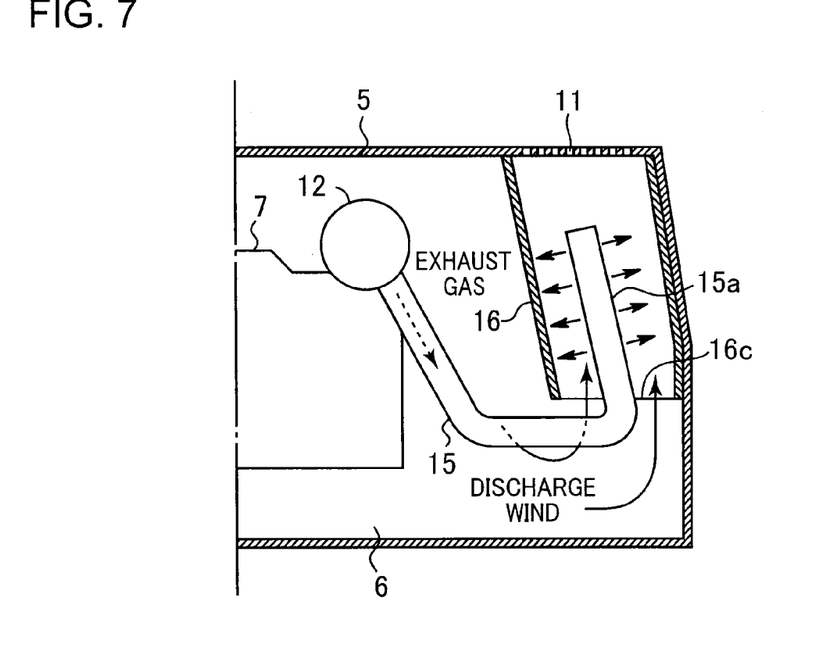
FIG. 7 is a schematic cross-sectional view of a portion of an engine room according to a fifth embodiment of the present invention.

See FIG. 7

In the fifth embodiment illustrated in FIG. 7, similarly to the known technique, the inserted portion 15a of the exhaust gas pipe 15 is inserted upwardly into the duct 16 from an inlet-side opening 16c of the duct 16. Moreover, in the fifth embodiment, the inserted portion 15a is configured such that the exhaust gas is jetted from the inserted portion 15a in a direction, which is different from the flowing direction of the discharge wind in the duct 16—more specifically a lateral direction—and is jetted so as to be dispersed in the circumferential direction and the longitudinal direction of the inserted portion 15a. The inserted portion 15a may be configured so that the exhaust gas is jetted so as to be dispersed in only one of the circumferential direction and the longitudinal direction of the inserted portion 15a.

According to the configuration of the fifth embodiment, the mixing efficiency of the exhaust gas and the discharge wind and the noise reduction effect can be improved as compared to the known technique.

Although the respective embodiments have been described for a case where the duct 16 is provided so as to extend in the up-down direction, the present invention can be applied to a case where the duct 16 is provided so as to extend in the lateral direction (horizontal direction or with a rising inclination).

Moreover, the present invention is not limited to a hydraulic shovel, but similarly to the above, can be applied to another construction machine having a configuration in which the construction machine includes an engine room and the cooling air and the exhaust gas are discharged to the outside from the engine room.

Other Embodiment

Figure 8:
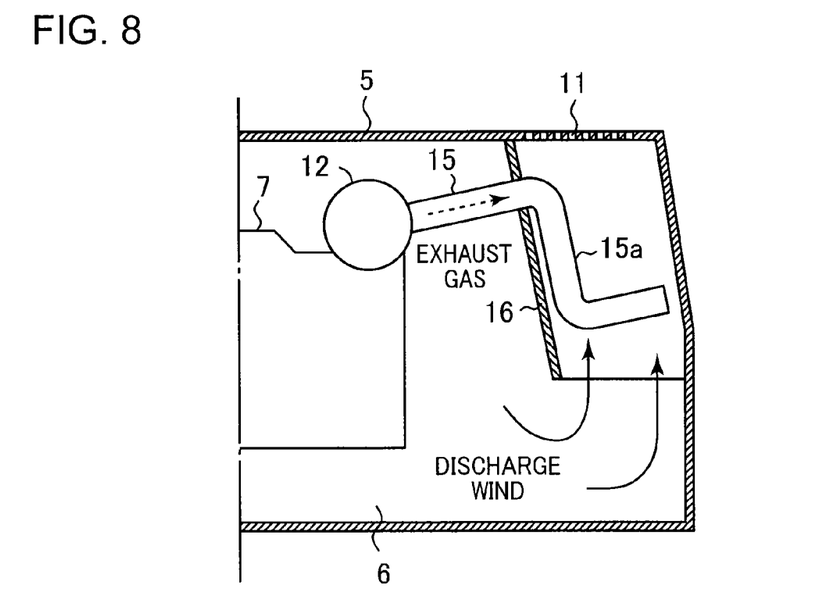
FIG. 8 is a schematic cross-sectional view of a portion of an engine room according to the other embodiment of the present invention.

See FIG. 8

As illustrated in FIG. 8, a portion of the duct 16 may be formed of the engine cover 5. Specifically, a portion of a side wall of the duct 16 may be formed of a portion of a side wall of the engine cover 5. Although FIG. 8 illustrates an example in which a portion of the duct 16 of the third embodiment is formed of the engine cover 5, in the respective embodiments other than the third embodiment, a portion of the duct 16 may be formed of the engine cover 5 in a similar way.

SUMMARY OF EMBODIMENTS

The embodiments are summarized as follows.

A construction machine according to the embodiment includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct, wherein a portion on a distal end side of the exhaust gas pipe is inserted into the duct, and the inserted portion of the exhaust gas pipe inserted into the duct is formed with an exhaust hole which causes the exhaust gas to be discharged in a direction different from a flowing direction of discharge wind in the duct through the exhaust hole.

According to this configuration, the exhaust gas is discharged in a direction different from the flowing direction of the discharge wind in the duct rather than being discharged in the flowing direction of the discharge wind as in the known technique. Here, since the exhaust gas has high pressure and flow rate and is jetted in a direction different from the flowing direction of the discharge wind in the duct, the exhaust gas mixes with the discharge wind in a large area in the cross-section of the duct. Due to this, the mixing efficiency of the exhaust gas and the discharge wind is improved, and therefore the effect of decreasing the temperature of the exhaust gas can be improved. Moreover, according to this configuration, since the exhaust gas is jetted in a direction different from the flowing direction of the discharge wind so as to be dispersed in the duct, it is possible to obtain a sound damping effect resulting from reflection of sound on the inner surface of the duct and to improve the effect of reducing noise in the duct. As a result, it is possible to improve the noise reduction effect.

A construction machine according to the embodiment includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct, wherein a portion on a distal end side of the exhaust gas pipe is inserted into the duct, and the inserted portion of the exhaust gas pipe inserted into the duct is formed with an exhaust hole which causes the exhaust gas to be discharged so as to be dispersed in a longitudinal direction of the inserted portion through the exhaust hole.

According to this configuration, the exhaust gas is discharged so as to be dispersed in the longitudinal direction of the inserted portion of the exhaust gas pipe in the duct. Thus, similarly to the above configuration in which the inserted portion of the exhaust gas pipe is formed with the exhaust hole which causes the exhaust gas to be discharged in a direction different from the flowing direction of the discharge wind in the duct through the exhaust hole, it is possible to improve the mixing efficiency of the exhaust gas and the discharge wind and to improve the sound reduction effect. Therefore, it is possible to improve the effect of decreasing the temperature of the exhaust gas and the noise reduction effect.

A construction machine according to the embodiment includes: an engine room provided with an intake opening and a discharge opening; a fan for sucking cooling air into the engine room through the intake opening; a duct provided in the engine room so as to communicate with the discharge opening and discharging the cooling air sucked into the engine room to an outside of the engine room through the discharge opening; and an exhaust gas pipe guiding exhaust gas discharged from the engine into the duct, wherein a portion on a distal end side of the exhaust gas pipe is inserted into the duct, and the inserted portion of the exhaust gas pipe inserted into the duct is formed with an exhaust hole which causes the exhaust gas to be discharged in a direction different from a flowing direction of discharge wind in the duct through the exhaust hole and causes the exhaust gas to be discharged so as to be dispersed in a longitudinal direction of the inserted portion through the exhaust hole.

According to this configuration, since the synergistic effects of the two configurations can be obtained, it is possible to further improve the mixing efficiency of the exhaust gas and the discharge wind and to further improve the sound reduction effect. Therefore, it is possible to further improve the effect of reducing the temperature of the exhaust gas and the noise reduction effect.

In the construction machine, it is preferable that the inserted portion of the exhaust gas pipe is inserted into the duct so as to extend in a direction intersecting an extension direction of the duct.

By doing so, the inserted portion of the exhaust gas pipe can be positioned over a large area of the cross-section of the duct in a state of crossing the inside of the duct. Thus, in any one of the configuration where the exhaust hole causes the exhaust gas to be discharged in a direction different from the flowing direction of the discharge wind through the exhaust hole and the configuration where the exhaust hole causes the exhaust gas to be discharged so as to be dispersed in the longitudinal direction of the inserted portion of the exhaust gas pipe through the exhaust hole, the exhaust gas can be easily jetted in a large area in the duct from the inserted portion of the exhaust gas pipe.

In this case, it is preferable that the exhaust hole is formed in a semi-circumferential portion of the inserted portion of the exhaust gas pipe and the semi-circumferential portion is positioned on a leeward side of the discharge wind in the duct.

By doing so, it is possible to suppress the discharge wind and the exhaust gas from colliding with each other in the duct to generate sound and to prevent the exhaust gas in the duct from hampering ventilation.

In the construction machine, as a specific configuration for discharging the exhaust gas in a large area in the duct, the exhaust holes may be formed at respective positions different circumferentially of the inserted portion of the exhaust gas pipe from each other. Moreover, the exhaust holes may be formed at respective positions different longitudinally of the inserted portion of the exhaust gas pipe from each other. Alternatively, these configurations may be combined so that the exhaust holes are formed at respective positions different circumferentially of the inserted portion of the exhaust gas pipe from each other and are formed at respective positions different longitudinally of the inserted portion of the exhaust gas pipe from each other. Moreover, as a modification of this case, the exhaust holes may be slots formed in a range corresponding to a predetermined length (for example, substantially the entire length) of the inserted portion of the exhaust gas pipe.

In this case, it is preferable that an opening area of the exhaust holes per unit length of the inserted portion gradually decreases toward the distal end side of the inserted portion so that the amounts of the exhaust gas discharged from the exhaust holes are substantially equalized in the longitudinal direction of the inserted portion.

According to this configuration, the percentage of the opening area of the exhaust holes is relatively small on the distal end side of the inserted portion where the flow rate of the exhaust gas is highest, and the percentage of the opening area of the exhaust holes gradually increases from the distal end side toward the opposite side where the flow rate of the exhaust gas is low. Due to this, the amounts of the exhaust gas discharged are substantially equalized in the longitudinal direction of the inserted portion of the exhaust gas pipe. As a result, it is advantageous in terms of the mixing efficiency of the exhaust gas and the discharge wind and the sound reduction effect.

In the construction machine, it is preferable that the duct is formed with at least one bent portion, and the inserted portion of the exhaust gas pipe is disposed at a position upstream of the bent portion in the flowing direction of the discharge wind in the duct.

According to this configuration, the bent portion provided in the duct makes it difficult for overall noise to leak to the outside and the inserted portion of the exhaust gas pipe disposed at a position upstream of the bent portion makes in the flowing direction of the discharge wind makes it difficult for the discharge sound of the exhaust gas to leak to the outside.

In this case, it is preferable that the duct has an outlet-side opening which is an outlet of the discharge wind flowing through an inside of the duct, and the inserted portion of the exhaust gas pipe is provided in a state where the outlet-side opening of the duct is not visible from the outside through the outlet-side opening of the duct.

By doing so, since the generation of "direct sound" which noise in the engine room and the discharge sound of the exhaust gas come out directly from the duct can be prevented, it is particularly advantageous in terms of noise prevention or reduction.

As described above, according to the embodiments, it is possible to improve the mixing efficiency of the exhaust gas and the discharge wind and the sound reduction effect and to improve the effect of reducing the temperature of the exhaust gas and the noise reduction effect.

The invention claimed is:

1. A construction machine comprising:
    an engine room provided with an intake opening and a discharge opening;
    a fan for sucking cooling air into the engine room through the intake opening;
    a duct provided in the engine room so as to communicate with the discharge opening and discharging the cooling air sucked into the engine room to an outside of the engine room through the discharge opening; and
    an exhaust gas pipe guiding exhaust gas discharged from the engine into the duct, wherein
    an inserted portion on a distal end side of the exhaust gas pipe is inserted into the duct, and the inserted portion of the exhaust gas pipe inserted into the duct is provided with a part defining an exhaust hole through which the exhaust gas can be discharged in a discharge direction;
    the duct has a surrounding portion which radially surrounds the part of the inserted portion that defines the exhaust hole, wherein the surrounding portion extends in an extension direction;
    the part of the inserted portion defining the hole extends in a direction intersecting the extension direction; and
    the discharge direction is different from the extension direction.

2. The construction machine according to claim 1, wherein the exhaust hole is formed in a semi-circumferential portion of the inserted portion of the exhaust gas pipe, the semi-circumferential portion being positioned on a leeward side of the inserted portion of the exhaust gas pipe.

3. The construction machine according to claim 1, further comprising plural exhaust holes formed at respective positions of the inserted portion of the exhaust gas pipe, which respective positions are circumferentially different from each other.

4. The construction machine according to claim 1, further comprising plural exhaust holes formed at respective positions, which respective positions are longitudinally different from each other.

5. The construction machine according to claim 4, wherein an opening area of the exhaust holes per unit length of the inserted portion gradually decreases toward the distal end side of the inserted portion so that amounts of the exhaust gas discharged from the exhaust holes are substantially equalized in the longitudinal direction of the inserted portion.

6. The construction machine according to claim 1, wherein the duct is formed with at least one bent portion, and the inserted portion of the exhaust gas pipe is disposed at a position upstream of the bent portion in the flowing direction of the discharge wind in the duct.

7. The construction machine according to claim 6, wherein the duct has an outlet-side opening which is an outlet of the discharge wind flowing through the duct, and the inserted portion of the exhaust gas pipe is provided in a state where the outlet-side opening of the duct is not visible from the outside through the outlet-side opening of the duct.

8. A construction machine comprising:
an engine room provided with an intake opening and a discharge opening;
a fan for sucking cooling air into the engine room through the intake opening;
a duct provided in the engine room so as to communicate with the discharge opening and discharging the cooling air sucked into the engine room to an outside of the engine room through the discharge opening; and
an exhaust gas pipe guiding exhaust gas discharged from the engine into the duct, wherein
an inserted portion on a distal end side of the exhaust gas pipe is inserted into the duct, and the inserted portion of the exhaust gas pipe inserted into the duct is provided with a part defining an exhaust hole through which the exhaust gas can be discharged so as to be dispersed in a longitudinal direction of the inserted portion;
the duct has a surrounding portion which radially surrounds the part of the inserted portion that defines the exhaust hole, wherein the surrounding portion extends in an extension direction; and
the part of the inserted portion defining the hole extends in a direction intersecting the extension direction.

9. The construction machine according to claim 8, wherein the exhaust hole is formed in a semi-circumferential portion of the inserted portion of the exhaust gas pipe, the semi-circumferential portion being positioned on a leeward side of the inserted portion of the exhaust gas pipe.

10. The construction machine according to claim 8, further comprising plural exhaust holes formed at respective positions of the inserted portion of the exhaust gas pipe, which respective positions are circumferentially different from each other.

11. The construction machine according to claim 8, further comprising plural exhaust holes formed at respective positions, which respective positions are longitudinally different from each other.

12. The construction machine according to claim 11, wherein
an opening area of the exhaust holes per unit length of the inserted portion gradually decreases toward the distal end side of the inserted portion so that amounts of the exhaust gas discharged from the exhaust holes are substantially equalized in the longitudinal direction of the inserted portion.

13. The construction machine according to claim 8, wherein
the duct is formed with at least one bent portion, and
the inserted portion of the exhaust gas pipe is disposed at a position upstream of the bent portion in the flowing direction of the discharge wind in the duct.

14. The construction machine according to claim 13, wherein
the duct has an outlet-side opening which is an outlet of the discharge wind flowing through the duct, and
the inserted portion of the exhaust gas pipe is provided in a state where the outlet-side opening of the duct is not visible from the outside through the outlet-side opening of the duct.

15. A construction machine comprising:
an engine room provided with an intake opening and a discharge opening;
a fan for sucking cooling air into the engine room through the intake opening;
a duct provided in the engine room so as to communicate with the discharge opening and discharging the cooling air sucked into the engine room to an outside of the engine room through the discharge opening; and
an exhaust gas pipe guiding exhaust gas discharged from the engine into the duct, wherein
an inserted portion on a distal end side of the exhaust gas pipe is inserted into the duct, and the inserted portion of the exhaust gas pipe inserted into the duct is provided with an exhaust hole through which the exhaust gas can be discharged in a discharge direction, to cause the exhaust gas to be discharged so as to be dispersed in a longitudinal direction of the inserted portion;
the duct has a surrounding portion which radially surrounds the part of the inserted portion that defines the exhaust hole, wherein the surrounding portion extends in an extension direction;
the part of the inserted portion defining the hole extends in a direction intersecting the extension direction; and
the discharge direction is different from the extension direction.

16. The construction machine according to claim 15, wherein
the exhaust hole is formed in a semi-circumferential portion of the inserted portion of the exhaust gas pipe, the semi-circumferential portion being positioned on a leeward side of the inserted portion of the exhaust gas pipe.

17. The construction machine according to claim 15, further comprising plural exhaust holes formed at respective positions of the inserted portion of the exhaust gas pipe, which respective positions are circumferentially different from each other.

18. The construction machine according to claim 15, further comprising plural exhaust holes formed at respective positions, which respective positions are longitudinally different from each other.

19. The construction machine according to claim 18, wherein
an opening area of the exhaust holes per unit length of the inserted portion gradually decreases toward the distal end side of the inserted portion so that amounts of the exhaust gas discharged from the exhaust holes are substantially equalized in the longitudinal direction of the inserted portion.

20. The construction machine according to claim 15, wherein the duct is formed with at least one bent portion, and the inserted portion of the exhaust gas pipe is disposed at a position upstream of the bent portion in the flowing direction of the discharge wind in the duct.

21. The construction machine according to claim 20, wherein the duct has an outlet-side opening which is an outlet of the discharge wind flowing through the duct, and the inserted portion of the exhaust gas pipe is provided in a state where the outlet-side opening of the duct is not visible from the outside through the outlet-side opening of the duct.

* * * * *